Nov. 8, 1960 J. C. SIMS, JR 2,959,685

BISTABLE DEVICE

Filed Feb. 28, 1955 2 Sheets-Sheet 1

INVENTOR
JOHN C. SIMS, JR.

BY Charles C. English
AGENT

INVENTOR
JOHN C. SIMS, JR.

BY Charles C. English
AGENT

United States Patent Office 2,959,685 Patented Nov. 8, 1960

2,959,685

BISTABLE DEVICE

John C. Sims, Jr., Springhouse, Pa., assignor to Sperry Rand Corporation, New York, N.Y., a corporation of Delaware Filed Feb. 28, 1955, Ser. No. 490,851

24 Claims. (Cl. 307—88)

The present invention relates to bistable devices in the nature of flip-flops or information storage elements and is more particularly concerned with such devices comprising magnetic amplifiers.

Bistable devices are the basic circuits utilized in many present-day electronic and electrical applications, notably in computing apparatuses. One such form of bistable device has been termed a "flip-flop" and such devices are characterized by the fact that the device itself has two input lines whereby a pulse or signal input on one of the said lines will cause the device to assume one stable state, while a further pulse or signal on the other of the said lines causes the device to revert to or assume a second stable state.

In the past, bistable devices or flip-flops of the type generally described above, have normally been constructed in the form of vacuum tube circuitry, and such known devices have accordingly been subject to the disadvantages that they are relatively large in size, making disposition of components difficult; and further, that they are subject to breakage and to normal operating failures, thus raising serious questions of maintenance and the cost attendant thereto. In an attempt to reduce operational failures, other forms of electrical devices have been suggested for use in bistable devices. One such other form is the magnetic amplifier, and it is with this particular type of bistable device that the present invention is primarily concerned.

It is accordingly an object of the present invention to provide a bistable device which is inexpensive to construct and which exhibits considerable ruggedness.

A further object of the present invention resides in the provision of a bistable device in the nature of a flip-flop which utilizes a magnetic amplifier as a portion thereof.

A still further object of the present invention resides in the provision of a bistable device in the nature of a flip-flop which has more rapid recovery than has been the case heretofore.

Another object of the present invention resides in the provision of novel information storage means utilizing bistable devices.

A further object of the present invention resides in the provision of novel magnetic storage means which may be regenerated more rapidly than has been the case heretofore.

Still another object of the present invention resides in the provision of a bistable device which can be made in relatively small sizes.

In accordance with the foregoing objects, I provide a bistable device which comprises a magnetic amplifier having an input and an output. The device further includes a delay element such as a delay line or other storage means, coupled to the input thereof for selectively receiving, storing and returning signals to the said input, thereby to control the operation of the magnetic device over the hysteresis loop of its core.

In accordance with a preferred embodiment of the present invention, the storage means described above may comprise a delay line, and this delay line further includes means for selectively varying the terminating impedance thereof whereby the delay line reflects signals from said input back to said input with controllable polarity. By such an arrangement, the device of the present invention is caused to assume a first stable state, represented by the no-pulse output condition, when the said terminating impedance assumes a first predetermined magnitude. The device may also be caused to assume a second stable state, characterized by regularly occurring pulse outputs, when the said terminating impedance is caused to assume a further predetermined magnitude. The terminating impedance may be included as a portion of a diode clamp whereby the said impedance is responsive to external trigger pulses for selectively changing the effective value of said impedance between short circuit and open circuit. The bistable device of the present invention also includes a further source of control pulses coupled to either the input or output of the said amplifier, whereby the bistable device may be caused to revert from a pulse output producing stable state to the original stable state wherein no output pulses are produced.

In accordance with the arrangements to be discussed, the bistable device of the present invention is capable of being triggered by a fairly short time pulse and will then remain triggered in a resulting stable state until a further relatively short resting pulse is applied. In this respect, therefore, the device of the present invention assumes, in certain applications, the characteristics of a thyratron, in that it is capable of being triggered by a relatively short pulse and will remain in the triggered state until a resetting condition is established. The bistable device of the present invention might therefore be termed a "magnetic thyratron," and it finds ready utility in applications wherein this characteristic is desirably present, in addition to those other applications wherein true bistable or flip-flop action is desired.

The foregoing objects, advantages, construction and operation of the present invention will become more readily apparent from the following description and accompanying drawings, in which.

Figure 1:
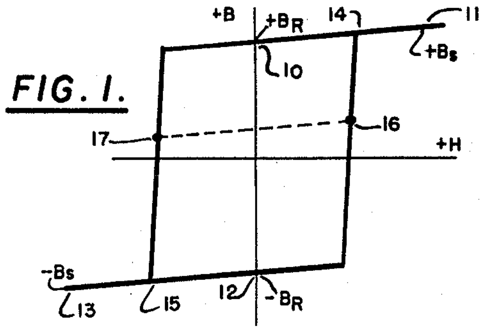
Figure 1 is an idealized hysteresis loop of a magnetic material which may be employed in the cores of a magnetic amplifier comprising my bistable device.

Referring now to Figure 1, it will be seen that the magnetic cores utilized in the magnetic amplifier stage of my novel bistable device preferably, but not necessarily, exhibit substantially rectangular hysteresis loops. Such cores may be made of a variety of materials, among which are various types of ferrites and various kinds of magnetic tapes, including Orthonik and 4–79 Moly-Permalloy. These materials may have different heat treatments to give them different desired properties. In addition to the wide variety of materials applicable, the cores of the magnetic amplifiers to be discussed may be constructed in a number of different geometries, including both closed and open paths. For example, cup-shaped cores, strips of material, or toroidal cores are possible. It is therefore to be understood that the present invention is not limited to any specific geometries of its cores nor to any specific materials therefor, and that the examples given are illustrative only.

Referring now to the hysteresis loop shown in Figure 1, it will be noted that the curve exhibits several significant points of operation, namely, point 10 (+B*r*), which represents a point of plus remanence; the point 11 (+B*s*), which represents a point of plus saturation; the point 12 (—B*r*), which represents minus remanence; the point 13 (—B*s*), which represents minus saturation; the point 14 which represents the beginning of the plus saturation region; and the point 15 which represents the beginning of the minus saturation region. Discussing for the moment the operation of a device utilizing a core which exhibits a hysteresis loop such as has been shown in Figure 1, let us assume that a coil is wound on the said core. If we should initially assume that the core is at an operating point 10 (plus remanence), and if a voltage pulse is applied to the coil which produces in the said coil a current creating a magnetomotive force in a direction tending to increase the flux in the said core (i.e. in a direction of +H), the core will tend to be driven from its plus remanence operating point 10 to its plus saturation operating point 11. During this state of operation there is relatively little flux change through the said coil, and the coil therefore presents a relatively low impedance whereby energy fed to the said coil during this state of operation will pass readily therethrough and may be utilized to effect a usable output.

On the other hand, if the core should initially be at point 12 (—B*r*), prior to the application of the said +H pulse, upon application of such a pulse the core will tend to be driven from the said minus remanence point 12 to the region of plus saturation. The pulse magnitude should preferably be so selected that the core is driven only to the beginning of the plus saturation region, point 14. During this particular state of operation there is a relatively large flux change through the said coil and the coil therefore exhibits a relatively high impedance to the applied pulse. As a result, substantially all the energy applied to the coil when the core is initially at —B*r* will be expended in flipping the core from operating point 12 to the region of plus saturation (preferably to point 14) and thence to operating point 10, with very little of this energy actually passing through the said coil to give a usable output. Thus, depending upon whether the core is initially at point 10 (+B*r*) or at point 12 (—B*r*), an applied pulse in the +H direction will be presented respectively with either a low impedance or a high impedance and will effect either a relatively large output or a relatively small output. These considerations are of great value in the construction of a bistable device such as may be utilized in the practice of the present invention.

Figure 2:
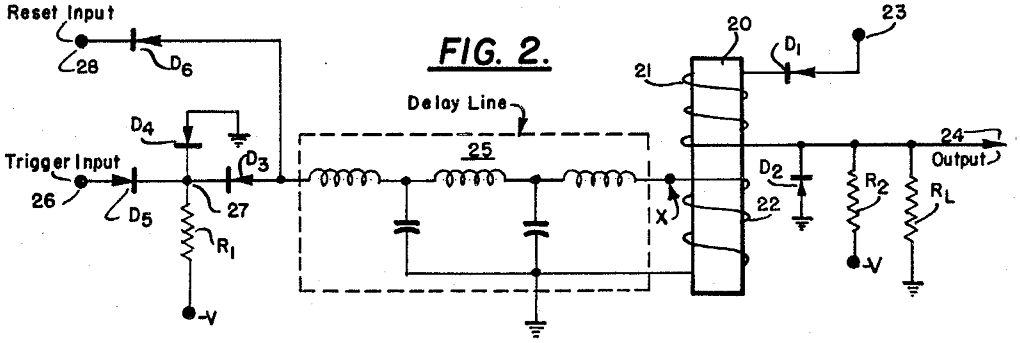
Figure 2 is a schematic representation of a simple bistable device in accordance with the present invention.
Figure 3:
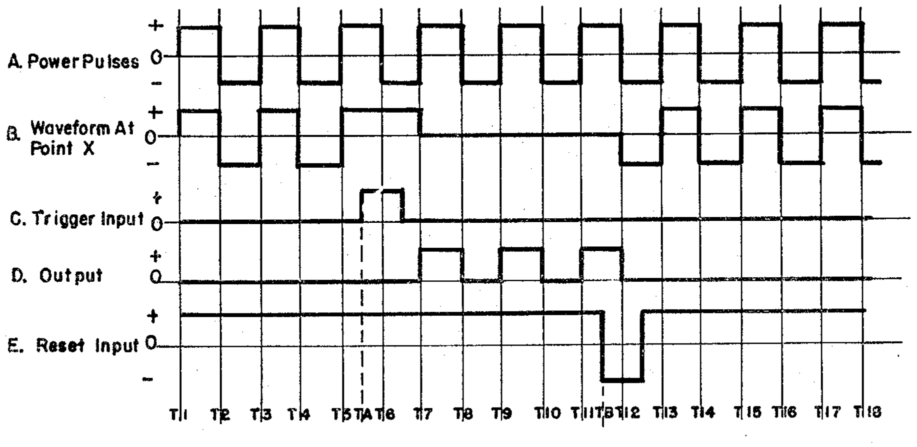
Figure 3 (A through E), are waveforms illustrating the operation of the device shown in Figure 2.

Referring now to the arrangement shown in Figure 2, it will be seen that the magnetic amplifier portion of the bistable device constructed in accordance with the present invention may comprise a core of magnetic material 20, preferably but not necessarily, exhibiting a hysteresis loop substantially the same as that described in reference to Figure 1. The core 20 carries two windings thereon, namely, a power or output winding 21 and a signal or input winding 22. One end of the power winding 21 is coupled via a rectifier D1 to a terminal 23 supplied with a source of positive and negative going power pulses of the type shown in Figure 3A. For purposes of the following discussion, these power pulses are assumed to have a center value of zero volts and to exhibit excursions between plus and minus V volts.

Coupled to the other end of the said power or output winding 21 is a load impedance $R_L$, and a sneak suppressor or clamp circuit comprising a resistor R2, connected to a source of negative potential —V, and a rectifier D2, connected to ground as shown. A delay line 25 is coupled at one of its ends across the signal or input winding 22, and the other end of the said delay line is coupled to the anodes of two rectifiers D3 and D6. The delay line 25 may assume any of the well known configurations known to those skilled in the art; and the particular LC circuit shown is merely illustrative. This delay line 25, however, is so constructed that it provides, between its ends, a time delay equal to one quarter of the period of the power pulses shown in Figure 3A. The cathode of rectifier D6 is coupled to a terminal 28 to which terminal is selectively applied a pulse type reset input of the type shown in Figure 3E, the said reset input being preferably negative going from a positive level. The cathode of rectifier D3 is further coupled to a point 27 comprising the junction of a rectifier D4 and a resistor R1, and the said R1—D4 circuit in turn comprises a clamp selectively holding one end of the delay line 25 at ground potential. Also coupled to the said junction point 27, via further rectifier D5, is a source of trigger input pulses 26 of the form shown in Figure 3C. The function of the various pulse sources and other components will become readily apparent from the following description.

If we should initially assume that the core 20 is at its minus remanence operating point 12, a positive going power pulse applied from terminal 23 via rectifier D1 to one end of the output winding 21 during the time interval *t*1 to *t*2 (see Figure 3), will cause the core 20 to be moved from its minus remanence operating point 12 to its plus remanence operating point 10, preferably via the operating point 14, during the said time interval *t*1 to *t*2. The resulting traverse of core 20 between the operating points 12 and 10 of its hysteresis loop, will cause a voltage to be induced by transformer action in the input winding 22 and this voltage is positive in potential at the point X. The induced positive voltage pulse will therefore be propagated by the delay line 25 via the rectifier D3 to junction point 27, and inasmuch as, in the absence of trigger input pulses, the clamp circuit comprising rectifier D4 and resistor R1 will be conductive, the delay line 25 will appear to be terminated in the very low impedance of the clamp. The pulse propagated down delay line 25 will therefore be reflected from the said low impedance termination with reversed polarity and will therefore arrive at the point X as a negative going voltage pulse at the time *t*2. It will be appreciated that the arrival of the reflected pulse does in fact occur after one half of the power pulse period, inasmuch as the delay line has an effective delay of one quarter of the power pulse period.

Thus, in the time interval *t*2 to *t*3, when the applied power pulse at terminal 23 is negative going, a negative input pulse, reflected from the low impedance termination of the delay line 25, appears at the point X. Inasmuch as the negative going power pulse causes rectifier D1 to be cut off during the time interval *t*2 to *t*3, the negative input pulse appearing at point X will cause a current to flow through the input winding 22 in a direction causing a magnetomotive force opposite to that effected by the application of a positive going power pulse via the rectifier D1. Thus, in the time interval *t*2 to *t*3, the reflected pulse appearing at point X causes core 20 to be driven from its plus remanence operating point 10 to its minus remanence operating point 12.

During the time period *t*3 to *t*4, a further positive going power pulse is applied from the terminal 23, via rectifier D1, to the power or output winding 21, whereby the core is once more caused to move from its minus remanence operating point 12 to its plus remanence operating point 10, and this action again induces a voltage in winding 22 which voltage is propagated down delay line 25, is reflected from the low impedance presented by the clamp termination, and appears at the point X with the said reverse polarity at the time *t*4, thereby causing the core 20 to be reverted once more to its minus remanence operating point 12. By way of summary, therefore, it will be seen that in the absence of input pulses at the trigger input 26, the core 20 will be caused to regularly traverse its hysteresis loop from the operating point 12 to the operating point 10, and thence back to the operating point 12, without producing a substantial output at output point 24.

It should be noted that although the core 20 operates on high impedance portions of its hysteresis loop during the operation described above, a small current will still tend to flow through the power or output winding 21 when the core 20 is being moved from its minus remanence operating point 12 to its plus remanence operating point 10, and this small current is termed a sneak output. The arrangement utilizing resistor R2 and rectifier D2 serves to suppress this sneak output, however. This suppression is effected by so choosing the magnitude of the resistor R2 that a current normally flows from ground through rectifier D2 and thence through the said resistor R2 to the source of negative potential —V, the magnitude of which current is equal to or greater than that of the sneak current to be suppressed. By this arrangement therefore only outputs substantially larger than that of the sneak current will appear at the output 24.

The arrangement thus far described may assume a first stable state, therefore, represented by a complete lack of pulse outputs at the output point 24. If a trigger input pulse should be applied to the terminal 26 at a time $t_A$, one quarter of a pulse period before the time $t6$ (see Figure 3C), the positive going trigger input so applied will raise the potential of the anode of rectifier D5 and will similarly raise the potential of junction point 27 and of the cathode of rectifier D3. The clamp circuit comprising rectifier D4 and resistor R1 will accordingly be rendered non-conductive and, in addition, rectifier D3 will be substantially cut off. A positive going power pulse applied via the rectifier D1 to winding 21 during the time interval $t5$ to $t6$ will, as before, induce a pulse in winding 22 which is positive at the point X, but this induced pulse, when now propagated down the delay line 25, will find that the delay line is effectively terminated in an open impedance whereby the pulse will be reflected from the said open circuit termination, this time without a reversal in polarity.

The pulse appearing at the point X during the time interval $t6$ to $t7$, due to reflection from the open end of delay line 25, will accordingly be of the same polarity as that originally propagated down the line, and this new pulse polarity will be in such a direction that the magnetizing effect of the power pulses applied to winding 21 are aided rather than opposed. The core 20 will therefore not be moved from operating point 10 to operating point 12 by the reflected pulse, but will remain at the plus remanence operating point 10, whereby the application of a still further positive going power pulse, during the time interval $t7$ to $t8$, will cause the core 20 to be driven from its plus remanence operating point 10 to its plus saturation operating point 11, thereby effecting a substantial output at point 24 across the load impedance $R_L$.

It should be noted that this new state of operation is in fact a second stable state, and will obtain indefinitely. This latter circumstance arises inasmuch as, when the core 20 is being driven from its operating point 10 to its operating point 11, the flux change occurring through the said core is relatively small and the pulse induced in winding 22 will be similarly small. Pulses propagated and reflected by the delay line 25 to the point X will therefore have insufficient magnitude to cause reversion of the core 20 and, therefore, once the device shown in Figure 2 is caused to remain at its plus remanence operating point 10 by the application of a trigger input at terminal 26, it will remain there indefinitely.

The bistable device may nevertheless be caused to revert to its original no-pulse stable state by application of a reset input of proper polarity. In the arrangement shown in Figure 2, such a reset input may be selectively applied at an input terminal 28 coupled to the cathode of rectifier D6, the anode of which is coupled as shown to one end of delay line 25. The terminal 28 is normally maintained at a positive potential whereby rectifier D6 is non-conductive (see Figure 3E), but if a reset pulse which is negative going in polarity should be applied to the said terminal 28 at a time $t_B$ for instance, one quarter of a pulse period prior to the time $t12$, the negative input so applied will cause rectifier D6 to conduct, whereby a pulse will be impressed upon the delay line 25 between ground and point 28, which pulse is of proper polarity and timing to revert the core 20 from its plus remanence operating point 10 to its minus remanence operating point 12. This reversion in fact occurs at the time $t12$ and is caused by the negative-going pulse appearing at point X during the time interval $t12$ to $t13$.

Having been reverted to its minus remanence operating point 12, the core 20 will once more merely traverse its hysteresis loop without producing a usable output until the next trigger input is applied at input terminal 26. The arrangement shown in Figure 2 is accordingly characterized by the two stable states described previously, and may be selectively triggered between the said states by application of pulse inputs at the terminals 26 and 28. It should further be noted that by using a delay line of the type shown in Figure 2, the resultant flip-flop circuit is characterized by a very rapid recovery rate.

The foregoing description of the present invention has assumed a delay line exhibiting a delay time between its ends of substantially one quarter of the period of the power pulses, shown in Figure 3A, or a total delay time for a reflected pulse of one half the power pulse period. Stating the problem in another way, the foregoing description has assumed a delay line exhibiting a delay time such that pulses induced in winding 22 may fall to zero before the reflected pulse is applied to the said input winding. It should be noted, however, that this particular limitation is not mandatory, and that the delay time of the line may be made somewhat less than this, whereby the operating speed of the device is increased substantially.

In accordance with a modification of the present invention, therefore, regeneration or reversion of the core is effected before the induced signal in winding 22 has gone to zero, whereby core 20 is reset more rapidly than before. Thus, referring once more to Figure 1, it will be seen that the core might be driven to a point 16 only, at which time a pulse reflected by the delay line utilized will cause reversion of the core along the line 16—17. By this method of operation, therefore, one achieves more rapid operation than was the case heretofore. This concept finds particular utility when bistable devices, such as have been disclosed, are employed as portions of a current coincident memory, and in this respect the operation may be described as pulse-envelope regeneration. In this latter case, the speed of operation of such a current coincident memory may be increased by commencing regeneration of the memory as soon as one is aware that the output of a particular cell is either a "1" or a "0." The concepts of regeneration discussed above utilizing a delay line, and more particularly those concepts which relate to delay lines of sufficiently short delay time to permit the more rapid operation of the present invention, find particular utility in resetting single or plural cores of magnetic material utilized as information storage elements, for instance in binary digital applications.

Figure 4:
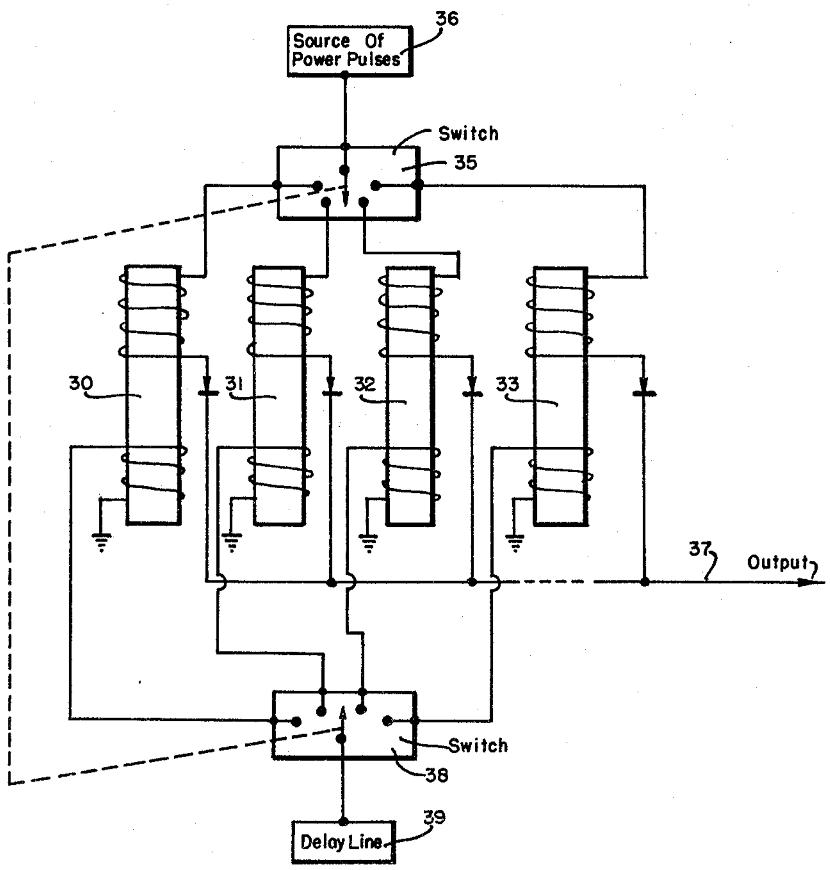
Figure 4 is a further schematic representation of an information storage array utilizing bistable devices operating in accordance with the present invention.

Thus, referring to Figure 4, it will be seen that a plurality of bistable elements, in accordance with the present invention, may be employed as portions of a current coincident memory. Such elements may comprise, for instance the cores 30, 31, 32, 33, etc., each of which may assume either a low impedance or a high impedance state characterized by operation at one or the other of its remanence points, thereby to selectively store information of one of two possible significances. The power windings of the several cores may be coupled, as shown, to a switching device 35 which is preferably electronic in nature, and the said switching device may in turn be selectively energized by a source of power pulses 36. In operation, information may be read into the cores 30 through 33, etc. by external means not shown; and readout of a selected core may be effected by applying a readout pulse from the power pulse source 36 via the switch 35 to the power winding of the particular core to be read. The lower ends of each of the power windings may be coupled to a common output terminal 37 whereby information read from any one of the said cores will appear at the said output.

In accordance with the concepts discussed previously, each of the input windings may be coupled at one of their ends via a switch 38 to a delay line 39, and the said switches 35 and 38 are preferably so synchronized that the application of a power pulse to a selected core is accompanied by the coupling of delay element 39 to the input winding of that core for regeneration purposes. Thus, by appropriately selecting the delay time of delay means 39, a signal reflected from the said delay means may effect regeneration of a core being read as soon as the output at terminal 37 has been detected to represent either a "1" or a "0," and before the pulse induced in the appropriate signal winding has gone to zero, whereby more rapid reading and regeneration of the magnetic memory is effected than has been the case heretofore.

While I have described preferred embodiments of the present invention, it must be emphasized that the foregoing description of the present invention is merely illustrative and is not meant to be limitative of my invention. Many variations will readily suggest themselves to those skilled in the art, and all such variations are meant to fall within the scope of the present invention as set forth in the appended claims. In particular, the method of applying reset input pulses shown in Figure 2 is not mandatory and appropriate pulse sources may be coupled to other points in the circuit, including points on the output winding 21, so long as the proper polarity and time considerations are observed to permit reversion of the core 20 from its plus remanence to its minus remanence operating points during the application of a negative-going power pulse. The particular method of varying the delay line termination, comprising a selectively conductive clamp circuit, may be replaced by other selective termination schemes without departing from the concepts described herein. In addition, the particular delay line or other storage device employed, as well as the precise forms of regenerated current-coincident memories utilizing such storage devices, in accordance with the principles of the present invention, may be varied in accordance with the requirements of a particular circuit.

Having thus described my invention, I claim:

1. A bistable device comprising a magnetic amplifier having a core, said core being substantially saturated at remanence, an input winding and an output winding, a source of power pulses coupled to a first point on said output winding, a load impedance coupled to a second point on said output winding spaced from said first point, a delay line coupled at one of its ends to said input winding, and means coupled to the other end of said delay line for selectively altering the terminating impedance of said other end of said delay line.

2. The bistable device of claim 1 wherein said last-named means comprises normally conductive clamp means coupled to said other end of said delay line, and means for selectively rendering said clamp means non-conductive.

3. The bistable device of claim 1 including means selectively applying control pulses to said other end of said delay line.

4. A bistable device comprising a magnetic amplifier having a core exhibiting a substantially rectangular loop, an input and an output, a delay line coupled at one of its ends to said input, first means coupled to the other end of said delay line for selectively changing the terminating impedance across said other end, second means coupled to said other end of said delay line for selectively coupling control pulses to said input via said delay line, and a load impedance coupled to said amplifier output.

5. The bistable device of claim 4 wherein said first means comprises an impedance coupled to said other end of said delay line by rectifier means, and pulse means for selectively rendering said rectifier means non-conductive.

6. The bistable device of claim 5 wherein said amplifier is energized from a source of regularly occurring power pulses having a predetermined pulse period, said delay line being so constructed that it provides a delay equal to one-quarter of the said pulse period.

7. A bistable device comprising a core of magnetic material exhibiting a substantially rectangular hysteresis loop, and having first and second windings thereon, a source of regularly occurring power pulses coupled to said first winding, delay means coupled to said second winding for reflecting pulses appearing across said second winding back to said second winding after a predetermined delay, and control means for selectively varying the polarity of pulses reflected by said delay means to said second winding.

8. The bistable device of claim 7 including a further source of pulses coupled to said second winding for selectively moving said core between preselected hysteretic operating points thereof.

9. The bistable device of claim 7 wherein said control means includes a rectifier coupled across one end of said delay means, and variable bias means for selectively rendering said rectifier conductive and non-conductive, thereby to vary the terminating impedance of said delay means between substantially short circuit and substantially open circuit.

10. A bistable device comprising a core of magnetic material exhibiting a substantially rectangular hysteresis loop, first and second windings on said core, a first source of pulses coupled to said first winding for causing said core to be moved from a first operating point to a second operating point whereby a pulse is induced in said second winding, storage means coupled to said second winding for receiving said induced pulse and for reapplying said pulse to said second winding after a predetermined time interval, control means coupled to said storage means for selectively controlling the polarity of pulse reapplied to said second winding from said storage means, thereby selectively to cause said core to be moved from said second operating point to said first operating point in response to one polarity of said reapplied pulse and to remain at said second operating point in response to the opposite polarity of said reapplied pulse.

11. The bistable device of claim 10 wherein said storage means comprises a delay line coupled at one of its ends to said second winding, said control means including pulse responsive means coupled to the other end of said delay line for varying the terminating impedance of said line between substantially short circuit and substantially open circuit.

12. The bistable device of claim 10 including a further source of pulses selectively coupled to one of said first and second windings for causing said core to be moved from said second operating point to said first operating point.

13. The bistable device of claim 11 including a further source of pulses coupled to said second winding via said delay line for causing said core to be moved selectively from said second operating point to said first operating point.

14. A bistable device comprising a core of magnetic material exhibiting a substantially rectangular hysteresis loop and having first and second windings thereon, means coupling a source of regularly occurring power pulses having a predetermined pulse period to one end of said first winding, an output impedance coupled to the other end of said first winding, a storage device comprising a delay line having a time delay between its ends of one-quarter of said pulse period, means coupling one end of said delay line to said second winding, a variable terminating impedance including rectifier means coupled to the other end of said delay line, first control pulse means coupled to said variable terminating impedance thereby to control selectively the conductivity of said rectifier and the effective magnitude of said terminating impedance, and second control pulse means coupled to one of said first and second windings.

15. A bistable device comprising a core of magnetic material having a substantially rectangular hysteresis loop and an input winding and an output winding thereon, a source of power pulses coupled to one end of said output winding, load means coupled to the other end of said output winding, a delay line coupled at one of its ends to said input winding, and means for selectively providing different impedances as a termination of said delay line at the other of its ends so that potentials induced in said input winding by the application of a power pulse to said output winding are reflected from said termination back to said input winding in a first sense after a predetermined time delay when said termination is of one value and in a second sense when said termination is of another value.

16. A bistable device comprising a core of magnetic material having a substantially rectangular hysteresis loop and first and second windings thereon, means selectively applying a pulse to said first winding whereby said core is moved away from a given point of operation on its hysteresis loop, and regeneration means coupled to said second winding, said regeneration means including means responsive to a potential induced in said second winding by the application of a pulse to said first winding for applying a further potential of one polarity to said second winding a predetermined time interval thereafter to return said core to its said given point of operation, and responsive to an input signal for applying to said second winding a further potential of polarity opposite to said one polarity at said predetermined time interval thereafter to maintain said core away from said given point of operation.

17. The bistable device of claim 16 wherein said means applying a pulse to said first winding applies such a pulse during a predetermined pulse period of time, said regeneration means being operative to apply said further potential to said second winding after a predetermined time interval equal to substantially one half of said pulse period.

18. The bistable device of claim 16 wherein said regeneration means includes means operative to apply said further potential to said second winding before said induced potential in said second winding falls to zero.

19. A bistable device comprising a magnetic amplifier having a core of magnetic material exhibiting a substantially rectangular hysteresis loop, an input winding and an output winding on said core, a source of power pulses coupled to one end of said output winding, a load impedance coupled to the other end of said output winding, a delay line coupled at one of its ends to said input winding, and means coupled to the other end of said delay line for selectively altering the terminating impedance of said other end of said delay line.

20. A bistable device comprising a core of magnetic material exhibiting a substantially rectangular hysteresis loop and having first and second windings thereon, a source of regularly occurring power pulses coupled to said first winding, delay means coupled to said second winding for reflecting pulses appearing across said second winding back to said second winding after a predetermined delay, and control means for selectively changing the terminating impedance of said delay means thereby to vary the polarity of pulses reflected by said delay means.

21. A bistable device comprising a core of magnetic material exhibiting a substantially rectangular hysteresis loop, first and second windings on said core, a first source of pulses coupled to said first winding for causing said core to be moved from a first remanence operating point of said core to a second remanence operating point of said core whereby a pulse is induced in said second winding, storage means coupled to said second winding for receiving said induced pulse and for applying a pulse of one or another polarity to said second winding after a predetermined time interval thereby selectively to cause said core to be moved from said second remanence operating point to said first remanence operating point or to be held at said second remanence operating point, respectively, and control means coupled to said storage means for selectively controlling the polarity of pulse applied to said second winding from said storage means.

22. A bistable device comprising a magnetic amplifier having a core of magnetic material exhibiting a substantially rectangular hysteresis loop, phase inversion means, and a delay element interconnecting said amplifier and said phase inversion means in a feedback loop.

23. A bistable device comprising a core of magnetic material exhibiting a substantially rectangular hysteresis loop and having first and second windings thereon, means selectively applying a pulse to said first winding whereby said core is moved away from a given point of operation on its hysteresis loop, and regeneration means coupled to said second winding, said regeneration means including a reflective delay line whereby a potential induced in said second winding by the application of a pulse to said first winding is reflected by said delay line back to said second winding after a predetermined time interval thereby to return said core to its said given point of operation.

24. A magnetic array comprising a plurality of cores of magnetic material exhibiting a substantially rectangular hysteresis loop, each of said cores having a first and second winding thereon, a source of power pulses, means selectively coupling a selected one of said first windings to said source of power pulses, regeneration means including a reflective delay line, and means selectively coupling said regeneration means to a said second winding corresponding to the core carrying said selected first winding.

References Cited in the file of this patent

UNITED STATES PATENTS

| | | |
|---|---|---|
| 2,709,798 | Stagall | May 31, 1955 |
| 2,713,674 | Schmitt | July 19, 1955 |
| 2,713,675 | Schmitt | July 19, 1955 |
| 2,813,260 | Kaplan | Nov. 12, 1957 |